US006606674B1

United States Patent
Howard

(10) Patent No.: US 6,606,674 B1
(45) Date of Patent: Aug. 12, 2003

(54) METHOD AND APPARATUS FOR REDUCING CIRCULAR LIST'S THRASHING BY DETECTING THE QUEUES' STATUS ON A CIRCULAR LINKED LIST

(75) Inventor: John S. Howard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/512,547

(22) Filed: Feb. 24, 2000

(51) Int. Cl.[7] ............................................. G06F 13/00
(52) U.S. Cl. ......................... 710/100; 710/55; 710/105; 710/107; 710/113; 710/54
(58) Field of Search ................................ 710/113, 107, 710/100, 105, 301, 5, 29, 52, 54, 55; 713/601; 370/347; 400/124.07; 707/1; 711/103; 712/237; 716/5

(56) References Cited

U.S. PATENT DOCUMENTS

| | | | | |
|---|---|---|---|---|
| 4,263,649 A | * | 4/1981 | Lapp, Jr. ..................... | 710/107 |
| 4,644,472 A | * | 2/1987 | Montgomery ................ | 710/29 |
| 4,664,541 A | * | 5/1987 | Stefani .................. | 400/124.07 |
| 4,682,284 A | * | 7/1987 | Schrofer ...................... | 710/55 |
| 4,692,893 A | * | 9/1987 | Casper ........................ | 710/55 |
| 4,816,996 A | * | 3/1989 | Hill et al. ...................... | 710/5 |
| 4,851,987 A | * | 7/1989 | Day ........................... | 713/601 |
| 4,958,277 A | * | 9/1990 | Hill et al. ..................... | 710/52 |
| 5,163,016 A | * | 11/1992 | Har'El et al. .................. | 716/5 |
| 5,265,229 A | * | 11/1993 | Sareen ....................... | 710/100 |
| 5,363,485 A | * | 11/1994 | Nguyen et al. ............. | 710/113 |
| 5,386,514 A | * | 1/1995 | Lary et al. ..................... | 710/54 |
| 5,555,266 A | * | 9/1996 | Buchholz et al. ........... | 370/347 |
| 5,692,168 A | * | 11/1997 | McMahan .................... | 712/237 |
| 5,805,922 A | * | 9/1998 | Sim et al. ....................... | 710/5 |
| 5,956,742 A | * | 9/1999 | Fandrich et al. ............ | 711/103 |
| 5,983,292 A | * | 11/1999 | Nordstrom et al. .......... | 710/54 |
| 6,119,190 A | * | 9/2000 | Garney ....................... | 710/310 |
| 6,128,673 A | * | 10/2000 | Aronson et al. ............ | 710/105 |
| 6,308,167 B1 | * | 10/2001 | Brinkmeyer ................... | 707/1 |

OTHER PUBLICATIONS

Simon Borst, "Polling Systems (Queues)", 1994, Katholieke Universiteit Brabant, Netherlands, abstract.*

Thomas Cormen, Charles Leiserson, Ronald Rivest, "Introduction To Algorithms", 1990, Massachusetts Institute of Technology, pp 200–203.*

* cited by examiner

Primary Examiner—Gopal C. Ray
Assistant Examiner—Justin King
(74) Attorney, Agent, or Firm—Trop, Pruner & Hu, P.C.

(57) ABSTRACT

A host controller, such as a host controller for a Universal Serial Bus, may process isochronous and interrupt transfers on a preferential basis. If time permits, bulk and control transfers may be executed. The bulk and control transfers may be executed in queues having a queue context made up of a queue head and one or more transfer descriptors. These queues may be processed one after another in a circular linked list. By uniquely marking an element in the circular linked list and determining the status of the transfer operation, the host controller can be avoid thrashing the bus when the reclaim list is empty.

13 Claims, 4 Drawing Sheets

METHOD AND APPARATUS FOR REDUCING CIRCULAR LIST'S THRASHING BY DETECTING THE QUEUES' STATUS ON A CIRCULAR LINKED LIST

BACKGROUND

This invention relates generally to host controllers.

A host controller provides a hardware and software interface between a bus device and software associated with a processor-based system that controls the device. A host controller interface for Universal Serial Bus (USB) (Universal Serial Bus Specification, Revision 1.0, published in January 1996) devices is disclosed in the Universal Host Controller Interface (UHCI) Rev. 1.1, March 1996, available from Intel Corporation, Santa Clara, Calif.

The host controller moves data between the system memory and devices on the USB by processing data structures in system memory and generating transactions on the USB. The collection of data structures is a schedule of transactions that is set up in system memory by the host controller driver software. For example, the host controller may be a Peripheral Component Interconnect (PCI) (see PCI Local Bus Specification, Rev. 2.1, available from the PCI Special Interest Group, Portland, Oreg. 97214) bus device. The host controller may be a PCI bus master in some implementations.

Using USB as an example, there are four transfer types. The isochronous type is characterized by a constant fixed rate transfer between the USB device and the host. Small spontaneous data transfers from a device are called interrupt transfers. The interrupt transfer type supports devices that require a predictable service interval but do not necessarily produce a predictable flow of data. Isochronous and interrupt transfer types are managed as a periodic bandwidth resource. Control transfers convey device control, status and configuration information. Bulk transfers provide a guaranteed transmission of data between client and host under a lax latency requirement. Control and bulk transfer types are managed as an asynchronous bandwidth resource.

A transfer descriptor is a schedule data structure that contains a pointer to a data buffer and contains control and status fields for the data transmission or reception. Transfer descriptors are used for all transfer types. Bulk, control and interrupt transfer types use additional queuing data structures to allow the transfer descriptors (for these transfer types) to be managed as a queue.

USB is a Time/Data Multiplexed (TDM) bus. A USB frame is a one-millisecond period during which the host controller issues transactions to transfer data. In UHCI, if there is isochronous data to be transferred, a host controller driver schedules these transactions first. The host controller driver manages periodic bandwidth on the USB (e.g. isochronous and interrupt), and ensures that it does not schedule more isochronous and interrupt transactions than can complete in 90% of a USB frame. The remaining time left in the frame (after the periodic transactions have completed) is used to execute asynchronous transactions (e.g. bulk and control).

Control and bulk transfers are scheduled last to take advantage of bandwidth reclamation on a lightly loaded USB. Bandwidth reclamation allows the hardware to continue executing a schedule until time runs out in a frame, cycling through queue entries as frame time allows.

The schedule in main memory is constructed so asynchronous transaction items follow the periodic transaction items. When a control or bulk transfer is in the schedule, the last item in the frame's periodic list points to the beginning of the asynchronous list. The periodic list contains isochronous transfer descriptors and interrupt queues. The asynchronous list contains bulk and control queues. Bandwidth reclamation is implemented by simply pointing the last queue on the asynchronous list to the first queue on the asynchronous list to construct a circular list. As long as time remains on the frame, the full speed control and bulk queues continue to be processed.

A transfer queue includes a queue head and a series of aligned transfer descriptors. Queue heads are data structures that organize transfer descriptors into queues. A queue head and associated transfer descriptor list form a queue context. Interrupt, control and bulk data transfer types can be placed in queues.

Thus, if time permits, the host controller executes transfer descriptors in the bulk and control queue heads. Thus, a plurality of queue heads may be arranged above a plurality of transfer descriptors in a plurality of queues. The host controller executes the top transfer descriptor under each queue head in series. After each bus transaction, the host controller evaluates whether to advance the queue to the next transfer descriptor, before proceeding to the next queue head. At end of the series of queue heads, the host controller circles back and begins processing from the first queue head, repeating transactions for queues that did not advance in the last iteration and executing new transactions for queues that did advance.

If the available transfer descriptors have all been processed or if the bulk and control queue heads are all empty, the host controller thrashes the system bus continually, cycling through the bulk and control queue heads. The host controller spins over the circular list of queue heads looking for work to do and at the same time taking as much as seventy percent of the available PCI bandwidth to basically busy-wait on the circular list.

Thus, there is need for a way to reduce the busy-wait conditions arising from empty queue head lists during reclamation in host controllers.

DETAILED DESCRIPTION

A host controller may process a plurality of data transfers in a circular linked list. By providing a marker that indicates where the controller began processing the queued transfers, the controller may determine, as it traverses the circular linked list, whether it has already checked for transfers which need to be processed. In this way, if there are no more transfers waiting in any of the queues comprising the list, the controller may stop processing until the next frame boundary, and avoid thrashing the bus.

Figure 1:
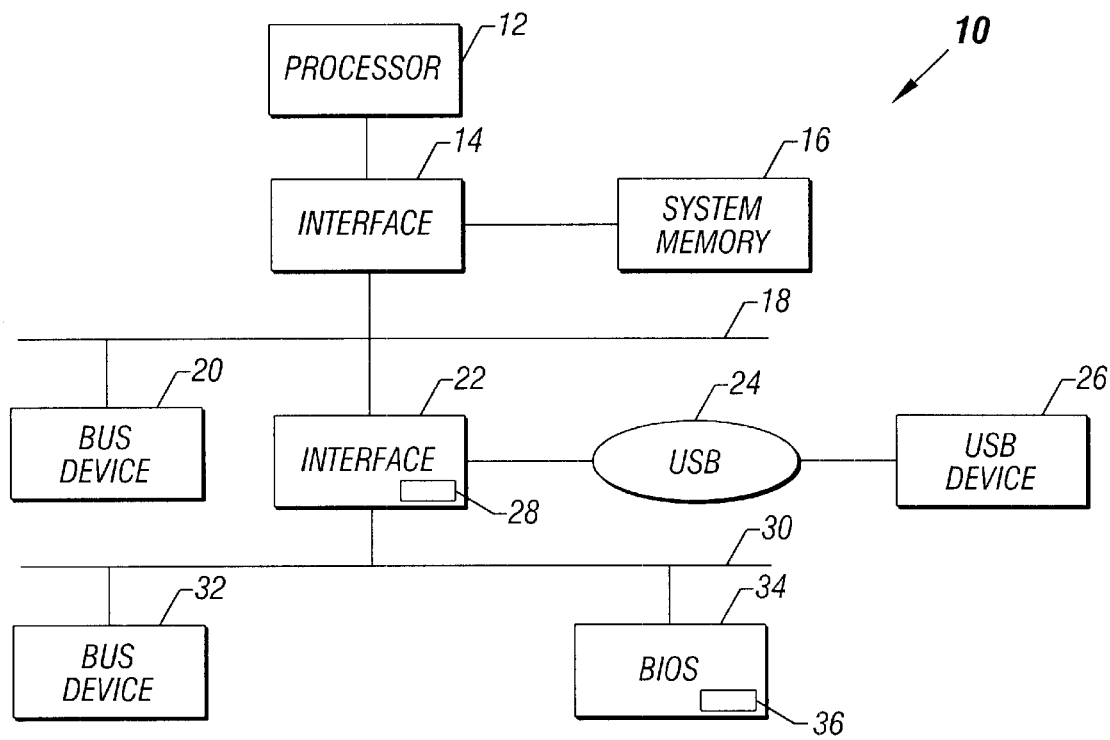
FIG. 1 is a block diagram of a processor-based system in accordance with one embodiment of the present invention.

Referring to FIG. 1, a processor-based system 10 may include a processor 12 coupled by an interface 14 to a system memory 16 and a bus 18 such as a PCI bus. A bus device 20 may be coupled to the bus 18. An interface 22 may be coupled to the bus 18. In one embodiment of the present invention, the interface 22 may be a bridge, which couples a bus 24 and a bus device 26. The interface 22 may include a host controller 28 in accordance with one embodiment of the present invention. The interface 22 may also couple a legacy bus 30 which in turn supports a bus device 32 and a storage 34 for a basic input/output system (BIOS) that may also include additional software 36.

Figure 2:
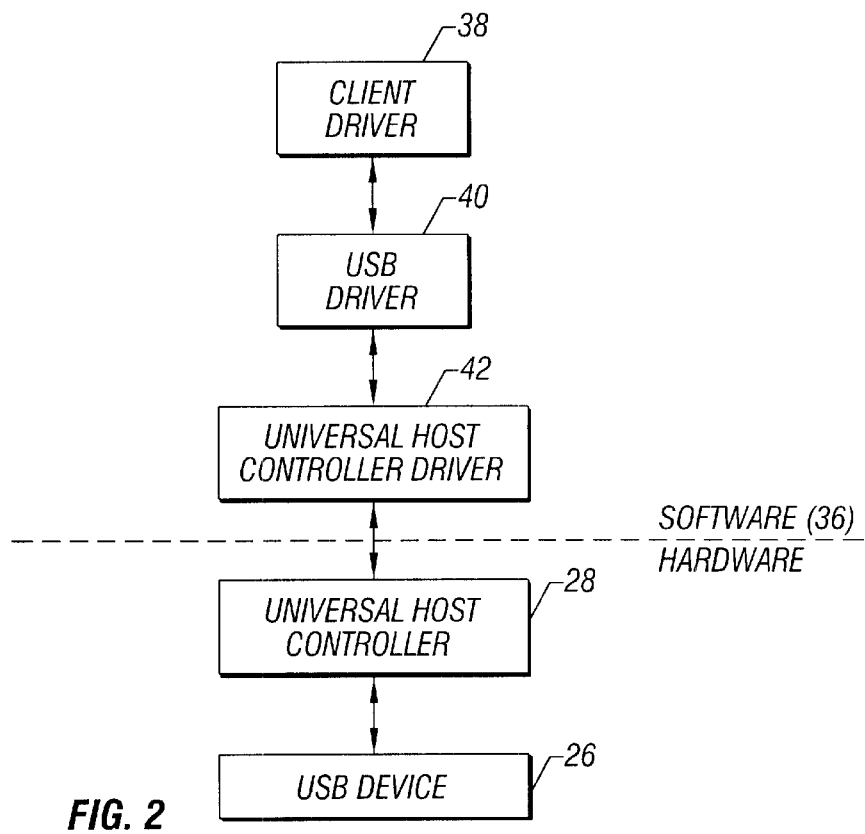
FIG. 2 is a schematic diagram showing one embodiment of the present invention.

Referring to FIG. 2, a controller, such as a UHCI compliant controller in accordance with one embodiment of the invention, may be composed of a number of hardware and software layers. Client driver software 38 executes on the host processor-based system 10 corresponding to a particular bus device such as the device 26. Client software may be part of the operating system or may be provided with the bus device 26 as two examples. The bus driver 40 may be system software that supports the bus, such as a USB bus, in a particular operating system. The host controller driver 42 provides a software layer between the host controller hardware and the bus driver 40. In the UHCI, the host controller driver 42 interprets requests from the bus driver 40 and builds a schedule, comprised of a frame list, queue heads, transfer descriptors, and data buffer data structure for the host controller. The schedule data structures are built in system memory 16 and contain information to provide end to end communication between client software, the host processor-based system 10 and the bus device 26.

The host controller 28 is managed by the software 36. A UHCI host controller executes the schedule list generated by the host controller driver 42 and reports the status of the transactions on the bus to the host control driver 42, via the transaction descriptors.

Command execution includes generating serial bus tokens and/or data packets based on the command description in the transaction descriptors and initiating transmission on the bus. For commands that use the host controller 28 to receive data from a bus device 26, the host controller 28 receives the data and then transfers it to a system memory 16 location pointed to by the transaction descriptor. The UHCI's host controller driver 42 provides sufficient commands and data to keep ahead of the host controller execution and analyzes the results as the commands are completed.

The bus device 26 is a hardware device that performs a useful end user function. Interaction with the bus device 26 flows from the applications through the software and hardware layers to the device 26.

In the UHCI, the host controller 28 supports real time data delivery by generating a start of frame packet every millisecond. The data structures may include a frame list, isochronous transfer descriptors, queue heads and queued transfer descriptors. These data structures are utilized by the host controller driver software 42 to construct a schedule in host memory 16 for a host controller 28 to execute. The host controller 28 is programmed with the starting address of the frame list and then released to execute the schedule without overt synchronization of the host controller drivers 42 in one embodiment of the invention. The transfer descriptors point to data buffers and include information about addressing, data and the general behavior characteristics of the transactions.

Figure 3:
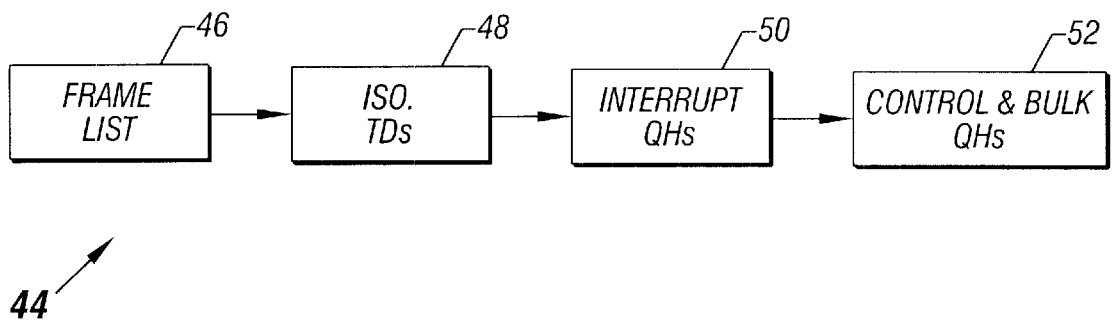
FIG. 3 shows the sequence of processing data transfers in accordance with one embodiment of the present invention.

Flow through the schedule is based on link pointers in the frame list 46, the transfer descriptors and the queue heads, as shown in FIG. 3. The link pointers connect the scheduled data objects together. The host controller 28 uses a link pointer to determine where to find the next transfer descriptor to execute. Addresses in the link pointer fields are physical addresses and not virtual addresses. Thus, at the start of the frame, the host controller repeatedly follows link pointers, beginning at the current frame list 46 offset, pausing its traversal to form a transaction described by transfer descriptors, and stopping when the frame expires or a horizontal link pointer's terminate bit is set to a one.

The frame list 46 is an array that represents a window in time. Each entry corresponds to a particular one millisecond frame in a UHCI embodiment. An entry serves as a reference to the transactions the host controller should conduct during the frame. Each frame list entry includes a pointer to other data structures such as transfer descriptors or queue heads and control bits.

Starting from the frame list 46, the host controller processes the isochronous transfer descriptors 48 and then the interrupt transfer descriptors under the interrupt queue head as indicated in block 50. Finally, if time permits, control and bulk queue heads are processed as indicated in block 52.

Figure 4:
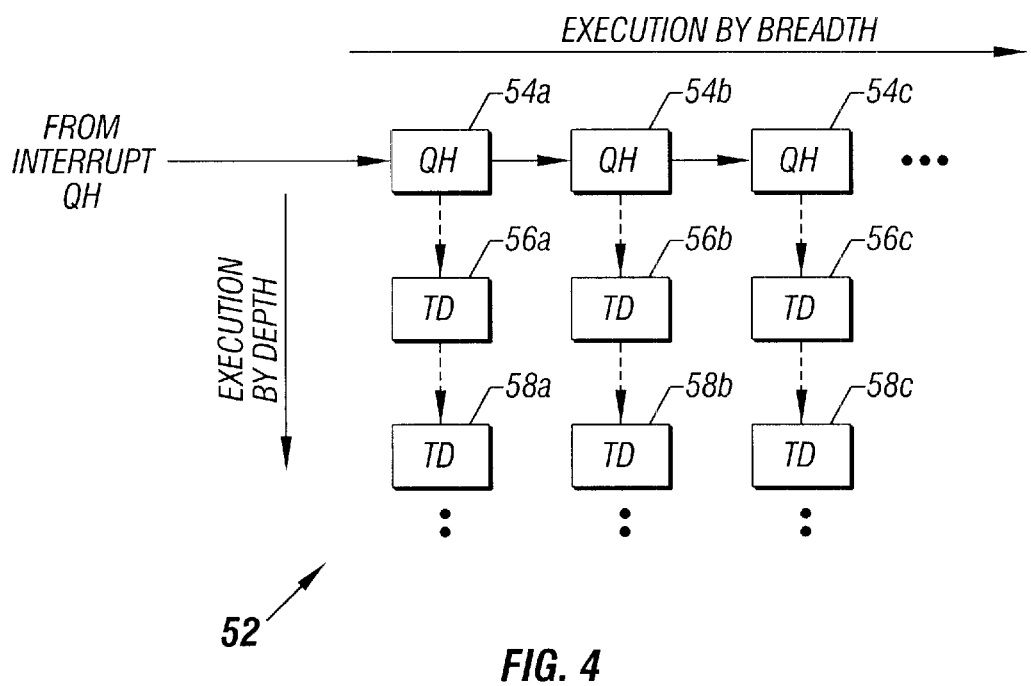
FIG. 4 shows a sequence for processing control and bulk transfers in accordance with one embodiment of the present invention.

Referring to FIG. 4, the execution of the control and bulk queue heads 54a, 54b and 54c may involve execution by breadth (i.e. from one queue head to the next queue head). Execution may also involve execution by depth, processing the transfer descriptors 56 and 58 one after another below a given queue head 54. A queue head and the aligned transfer descriptors underneath the queue head is called a queue.

Queues can be accessed directly from a frame list entry or from a transfer descriptor. Queue heads contain two link pointers, a vertical pointer that selects the next transfer descriptor in the queue context to be processed and a horizontal pointer that provides a link to the next queue head or transfer descriptor to be processed.

Figure 5:
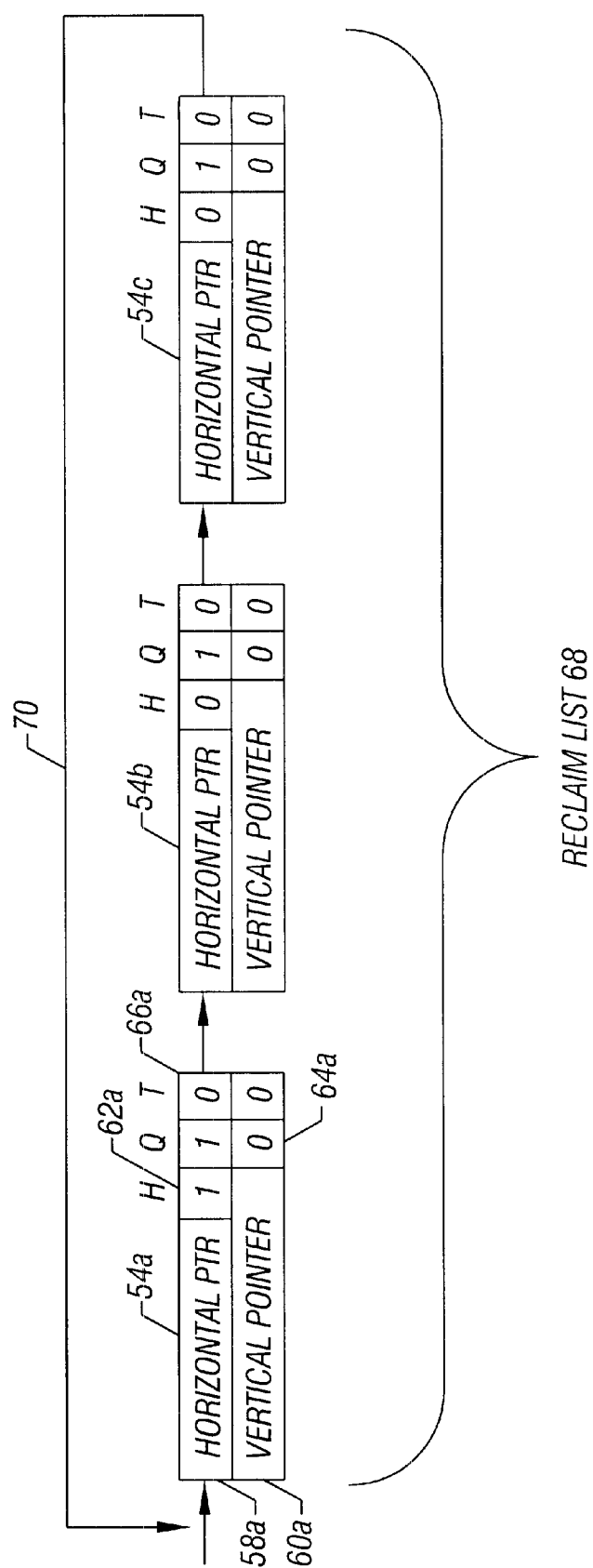
FIG. 5 shows a data structure for processing host and control transfers in accordance with one embodiment of the present invention.

Referring to FIG. 5, in an example with three queue heads 54, each queue head 54 (such as the queue heads 54a, 54b and 54c) may contain a link pointer to the next data object to be processed as well as control bits. The queue head may include a queue head link pointer field 58 that contains the address of the next object to be processed in the horizontal list. Each queue head 54 also includes a queue head/transfer descriptor select control bit "Q" indicated at 64. The bit 64 indicates to the hardware whether the item referenced by the link pointer is a transfer descriptor or a queue head. This allows the host controller to perform the proper type of processing on the item after it is fetched. Finally, each queue head 54 includes a terminate control bit "T" indicated at 66. The bit 66 indicates to the host controller that this is the last queue head 54 in the schedule. The terminate bit 66 is equal to one if the pointer is invalid and zero if the pointer is valid and points to a queue head or a transfer descriptor.

Thus, in the example shown in FIG. 5, each of the terminate bits 66 are valid and each of the select bits 66 are one which indicates that the next item is a queue head. If the item were a transfer descriptor, its Q bit 64 would be zero.

Each queue head 54 may include an additional control bit "H" which is the list head marker bit 62. The H bit 62 is set equal to one if the queue head 54 is the first queue head to be processed by the host controller. Thus, in this example, the queue head 54a has its marker or H bit 62a set equal to one while the queue heads 54b and 54c, which are subsequently processed, have their bits H set equal to zero. In this way, the host controller can determine the first queue head in the bulk and control transfer array 52 (FIG. 4) that was processed.

As indicated at 70 at FIG. 5, the queue heads 54a, 54b and 54c are linked into a circular linked list, which is traversed by the host controller. Queue heads are horizontally linked into a ring structure and transfer descriptors are linked vertically to each queue head, as shown in FIG. 4.

The list head marker bit 62 marks the starting point or the head of the circular list of queue head data structures. This bit acts as the reclaim list head marker. The host controller may implement another bit which is an indicator bit which keeps track of whether the host controller has executed a transaction.

Each time the host controller executes a transaction on the bus, it sets the indicator bit to a one. The host controller also sets the indicator bit to a one at the beginning of each frame. Each time the host controller encounters the reclaim list head marker 62, it looks at the indicator bit. If the indicator bit is set to a zero, the host controller stops traversing the schedule until the next frame. If the indicator bit is set to one, the host controller sets it to a zero and continues to traverse the schedule.

The indicator bit may be implemented in the control register in a UHCI embodiment and is writable by the host controller driver 42. The control register controls the initial conditions of a port. It may indicate whether a device is connected to a USB port, whether the port is disabled, and what is the bus line status.

The host controller driver 42 may add active transaction descriptors to the reclaim list 68 (FIG. 5) at any time. The host controller driver may restart the host controller traversing the reclaim list 68 by setting the indicator bit in the command register in a UHCI embodiment to a one. When the host controller encounters the stop condition described above, it retains its place in the circular queue head list. Writing to the command register (setting the indicator bit to a one) causes the host controller to resume execution traversal of the reclamation list.

Bulk and control transfer descriptors derive their guaranteed data delivery transfer characteristics through the use of queues. Initially, the host controller fetches the queue head and checks for a valid vertical pointer 60. If the pointer is valid (control T bit is set to zero), the host controller fetches the transfer descriptor or queue head pointed to by the queue head's pointer. If the reference is to a transfer descriptor, the host controller then decodes the transfer descriptor fields to determine whether the transfer descriptor is active and the transaction characteristics. If the transaction descriptor is active, then the host controller issues a USB token and performs the transaction. When the transaction completes, the host controller updates the transfer descriptor's status. If the transaction was successful, the transfer descriptor is marked as inactive.

If the transaction was unsuccessful, but the error threshold has not been reached, the transfer descriptor is left active so it can be retried. The retry will occur on the next list traversal. If the transaction was unsuccessful and exceeds the error threshold, the transfer descriptor is marked as inactive. If the transaction was successful, the host controller advances the queue by writing the link pointer from the current transfer descriptor into the queue head's vertical pointer field 60. If the depth/breadth select bit ($V_f$) is set to a one in the link pointer, the flow proceeds to fetch another transfer descriptor or queue head using the just deactivated transfer descriptor's link pointer. Otherwise, the host controller fetches the queue head or transfer descriptor pointed to by the current queue head's horizontal link pointer field 58. If the queue head horizontal link pointer field has the T bit set to one, the host controller idles until the one millisecond frame timer expires.

Figure 6:
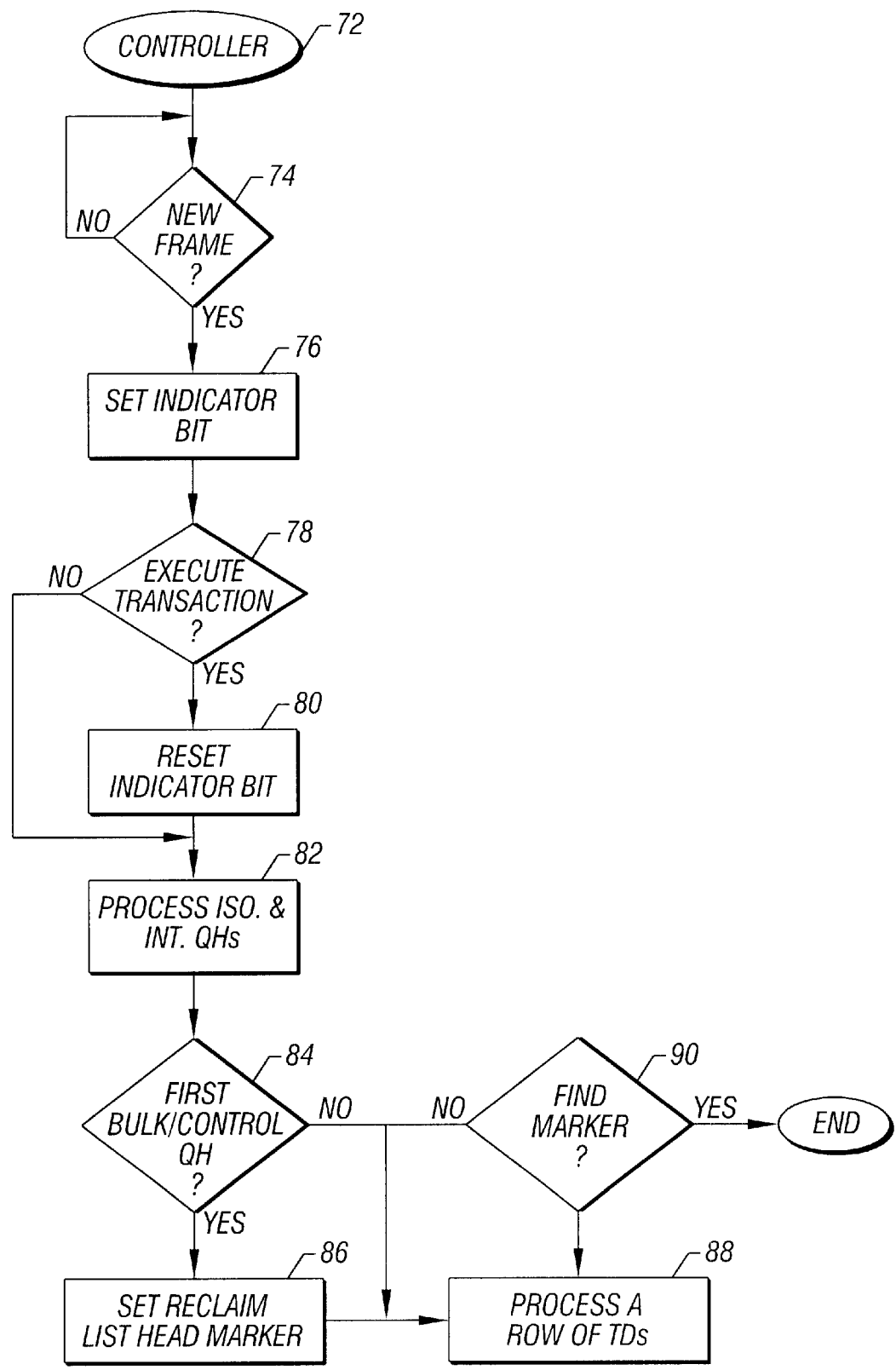
FIG. 6 shows a flow chart for software for providing an indicator to signify when no unprocessed data transfers are waiting to be processed in the queue.

In accordance with one embodiment shown in FIG. 6, the software 36 may begin by determining whether there is new frame as indicated at diamond 74. If so, the indicator bit is set to a one. A data structure (DS) is fetched as indicated in block 78. A check at diamond 80 determines whether the data structure is a queue head. If so, a check at diamond 82 determines if the H bit is set to one. If so, a check at diamond 84 determines whether the indicator is set to zero. If so, the controller idles until the end of the frame (EOF) as indicated at 86.

If the check at diamond 84 indicates that the indicator bit is set to one, the indicator bit is set to zero (block 90). Then a check at diamond 88 determines whether the queue head vertical terminate bit T is set to one. If so, a check at diamond 100 determines whether the queue head horizontal terminate bit is set equal to one. If so, the flow proceeds to EOF 86.

If the check at diamond 80 indicates that the data structure is not a queue head, then a check at diamond 92 determines whether the data structure is an active transfer descriptor. If so, the transfer descriptor is executed (block 94) and the indicator bit is set to one (block 96).

A check at diamond 98 determines whether the data structure is a queue context. If so, the flow proceeds to diamond 100 as described earlier. Otherwise, a check at diamond 102 determines whether the transfer descriptor link pointer bit T is set equal to one. If so, the flow idles at EOF until the frame timer expires. Otherwise the flow continues to await a new frame (diamond 74).

In this way, the host controller may detect that the reclaim list is empty of active transaction descriptors. When the list goes empty, the host controller does not spin over the circular list of queue heads looking for work to do and consuming bus bandwidth. Thus, the busy wait condition while the host controller spins through an empty list is reduced because the hardware may detect the empty list with one traversal of the reclaim list.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    implementing a plurality of bus transfers in a circular linked list;
    implementing said circular linked list with a plurality of queues and each queue has a queue head;
    providing a marker indicating said circular linked list's first transfer;
    scanning said circular linked list to locate transfers to execute;
    setting a bit to indicate whether said transfers have been completed; and
    terminating said scanning in response to locating said marker and said bit's state.

2. The method of claim 1 further including executing isochronous transfer and interrupt and thereafter executing control and bulk transfers.

3. The method of claim 2 including using said circular linked list to execute control and bulk transfer only.

4. The method of claim 3 including executing a transfer descriptor at a given depth on each iteration through said control and bulk queue heads.

5. An article comprising a medium for storing instructions that enable a processor-based system to:

implementing a plurality of bus transfers in a circular linked list;

implementing said circular linked list with a plurality of queues and each queue has a queue head;

providing a marker indicating said circular linked list's first transfer;

scanning said circular linked list to locate transfers to execute;

setting a bit to indicate whether said transfers have been completed; and terminating said scanning in response to locating said marker and said bit's state.

6. The article of claim 5 further storing instructions that cause the process-based system to set said bit to indicate whether transfers have been completed.

7. The article of claim 6 further storing instructions that cause the process-based system to scan the queue heads to locate transfers to execute.

8. The article of claim 5 further storing instructions that cause the process-based system to execute isochronous transfers and interrupt transfers and thereafter execute control and bulk transfers.

9. The article of claim 8 further storing instructions that cause the process-based ystem to use said circular linked list to execute control and bulk transfers only.

10. A processor-based system comprising:

a processor;

a host controller coupled to said processor;

implementing a plurality of bus transfers in a circular linked list;

implementing said circular linked list with a plurality of queues and each queue has a queue head;

providing a marker indicating said circular linked list's first transfer;

scanning said circular linked list to locate transfers to execute;

setting a bit to indicate whether said transfers have been completed; and terminating said scanning in response to locating said marker and said bit's state.

11. The system of claim 10 including a Universal Serial Bus coupled to said host controller.

12. The system of claim 10 wherein said host controller sets said bit to indicate whether a transaction has been completed.

13. The system of claim 10 wherein said host controller is a Universal Host Controller.

\* \* \* \* \*